United States Patent
Kimura et al.

(10) Patent No.: US 9,631,826 B2
(45) Date of Patent: Apr. 25, 2017

(54) COMBINED AIR-CONDITIONING AND HOT-WATER SUPPLY SYSTEM

(71) Applicants: Takanao Kimura, Tokyo (JP); Hirofumi Kouge, Tokyo (JP); Hironori Yabuuchi, Tokyo (JP)

(72) Inventors: Takanao Kimura, Tokyo (JP); Hirofumi Kouge, Tokyo (JP); Hironori Yabuuchi, Tokyo (JP)

(73) Assignee: Mistubishi Electric Corporation, Tokyo (JP)

( * ) Notice: Subject to any disclaimer, the term of this patent is extended or adjusted under 35 U.S.C. 154(b) by 155 days.

(21) Appl. No.: 14/647,510

(22) PCT Filed: Dec. 11, 2012

(86) PCT No.: PCT/JP2012/082002
§ 371 (c)(1),
(2) Date: May 27, 2015

(87) PCT Pub. No.: WO2014/091548
PCT Pub. Date: Jun. 19, 2014

(65) Prior Publication Data
US 2015/0308700 A1 Oct. 29, 2015

(51) Int. Cl.
*F24F 5/00* (2006.01)
*F25B 13/00* (2006.01)
(Continued)

(52) U.S. Cl.
CPC .......... *F24F 5/001* (2013.01); *F24D 11/0214* (2013.01); *F24D 19/1039* (2013.01);
(Continued)

(58) Field of Classification Search
CPC .... F24F 5/001; F24F 5/0096; F24F 2005/006; F24D 11/0214; F24D 19/1039;
(Continued)

(56) References Cited

U.S. PATENT DOCUMENTS 5,465,588 A * 11/1995 McCahill ................ F24D 15/04
165/240
6,418,737 B1 * 7/2002 Kuroki ...................... F24H 4/04
62/156

(Continued)

FOREIGN PATENT DOCUMENTS

JP        S60-175983 A    9/1985
JP        S63-41779 A     2/1988
(Continued)

OTHER PUBLICATIONS

Office Action issued Dec. 8, 2015 in the corresponding JP application No. 2014-551759 (with English translation).
(Continued)

*Primary Examiner* — Allana Lewin Bidder
*Assistant Examiner* — Kun Kai Ma
(74) *Attorney, Agent, or Firm* — Posz Law Group, PLC (57) ABSTRACT

The controller controls a bypass solenoid valve and hot-water supply expansion unit in a defrosting operation based on a refrigerant temperature detected by a first temperature sensor and a heat medium temperature detected by a second temperature sensor.

12 Claims, 5 Drawing Sheets (51) Int. Cl.
*F25B 49/02* (2006.01)
*F24D 11/02* (2006.01)
*F24D 19/10* (2006.01)

(52) U.S. Cl.
CPC ............ *F24F 5/0096* (2013.01); *F25B 13/00* (2013.01); *F25B 49/02* (2013.01); *F24F 2005/006* (2013.01); *F25B 2313/003* (2013.01); *F25B 2313/006* (2013.01); *F25B 2313/0231* (2013.01); *F25B 2313/0232* (2013.01); *F25B 2313/0233* (2013.01); *F25B 2313/0272* (2013.01); *F25B 2313/02741* (2013.01); *F25B 2400/13* (2013.01); *F25B 2600/2501* (2013.01); *Y02B 30/126* (2013.01)

(58) Field of Classification Search
CPC .. F25B 49/02; F25B 13/00; F25B 2313/0232; F25B 2313/0233; F25B 2313/003; F25B 2600/2501; F25B 2313/006; Y02B 30/126
See application file for complete search history.

(56) References Cited

U.S. PATENT DOCUMENTS

| | | | | |
|---|---|---|---|---|
| 6,837,443 B2* | 1/2005 | Saitoh | .................... | F24D 17/02 237/2 B |
| 7,481,067 B2* | 1/2009 | Nakayama | .............. | F25B 9/008 62/222 |
| 7,883,024 B2* | 2/2011 | Nakayama | .......... | F24D 19/1039 237/19 |
| 2004/0134225 A1* | 7/2004 | Sakamoto | ............... | F25B 9/008 62/498 |
| 2004/0244394 A1* | 12/2004 | Nakayama | .............. | F25B 9/008 62/190 |
| 2005/0189431 A1* | 9/2005 | Nakayama | ................ | F24H 4/04 237/12 |
| 2008/0092568 A1* | 4/2008 | Ookoshi | ................. | F24D 17/02 62/151 |
| 2010/0282434 A1* | 11/2010 | Yabuuchi | ............ | F24D 11/0235 165/63 |
| 2010/0282435 A1* | 11/2010 | Yabuuchi | ............ | F24D 17/0073 165/63 |
| 2011/0016897 A1* | 1/2011 | Akagi | ....................... | F24D 3/18 62/161 |
| 2011/0197600 A1* | 8/2011 | Hamada | .................... | F24H 4/04 62/79 |
| 2011/0314848 A1* | 12/2011 | Tanaka | .................... | F25B 13/00 62/126 |
| 2012/0222440 A1* | 9/2012 | Matsui | ...................... | F25B 7/00 62/159 |
| 2012/0291460 A1* | 11/2012 | Aoyagi | ................. | F25B 47/025 62/79 |
| 2013/0081419 A1* | 4/2013 | Katoh | .................... | B60H 1/004 62/278 |
| 2014/0033750 A1* | 2/2014 | Tanaka | .................... | F25B 13/00 62/151 |

FOREIGN PATENT DOCUMENTS

| | | |
|---|---|---|
| JP | H02-192538 A | 7/1990 |
| JP | H11-270920 A | 10/1999 |
| JP | 2002-071245 A | 3/2002 |
| JP | 2009-036485 A | 2/2009 |
| JP | 2009-041860 A | 2/2009 |
| JP | 2011-163729 A | 8/2011 |
| JP | 2012-197956 A | 10/2012 |
| WO | 2009/122477 A1 | 10/2009 |
| WO | 2012/164608 A1 | 12/2012 |

OTHER PUBLICATIONS

Extended European Search Report dated Jul. 11, 2016 issued in corresponding EP patent application No. 12889939.0.
International Search Report of the International Searching Authority mailed Jan. 29, 2013 for the corresponding international application No. PCT/JP2012/082002 (and English translation).

* cited by examiner

COMBINED AIR-CONDITIONING AND HOT-WATER SUPPLY SYSTEM

CROSS REFERENCE TO RELATED APPLICATION

This application is a U.S. national stage application of International Application No. PCT/JP2012/082002 filed on Dec. 11, 2012, the disclosure of which is incorporated by reference.

TECHNICAL FIELD

The present invention relates to a combined air-conditioning and hot-water supply system that is equipped with a heat pump cycle and can simultaneously provide a cooling load, a heating load, and a hot-water supply load.

BACKGROUND ART

To date, there are combined air-conditioning and hot-water supply systems that can simultaneously provide a cooling load, a heating load, and a hot-water supply load by using a single stage refrigeration cycle. As such a system, there is proposed "a multifunctional heat pump system including a refrigeration cycle that enables a cooling or heating operation, a hot water supply operation, a heat storage operation, and a cooling storage operation to be performed separately and simultaneously by using a refrigerant circuit that includes a compressor and in which the compressor, an outdoor heat exchanger, an indoor heat exchanger, a cooling energy storage tank, and a hot-water supply heat exchanger are connected to one another" (see Patent Literature 1, for example).

Among such systems, a system having the following configuration has been proposed (see Patent Literature 2, for example). In the system, a bypass pipe including a bypass solenoid valve installed in parallel with a hot-water supply heat exchanger is disposed between inlet and outlet ports of a refrigerant pipe connected to the hot-water supply heat exchanger. An amount of influx of refrigerant for hot-water supply into the hot-water supply heat exchanger is controlled by opening and closing the bypass solenoid valve for influx of the refrigerant for hot-water supply into the bypass pipe. If the surface temperature of the outdoor heat exchanger is equal to or lower than a temperature preset for performing a defrosting operation, the bypass solenoid valve is opened to allow the refrigerant for hot-water supply to flow into the bypass pipe.

CITATION LIST

Patent Literature

Patent Literature 1: Japanese Unexamined Patent Application Publication No. 11-270920 (see pages 3 and 4 and FIG. 1, for example)

Patent Literature 2: WO09/122477 (see pages 14 and 15 and FIG. 5, for example)

SUMMARY OF INVENTION

Technical Problem

In the combined air-conditioning and hot-water supply system described in Patent Literature 2, the refrigerant is bypassed by opening the bypass solenoid valve connected in parallel with the hot-water supply heat exchanger during the defrosting operation and is thereby prevented from flowing into the hot-water supply heat exchanger. Accordingly, in systems in which hot-water supply heat exchangers account for over half of heat exchangers on the use side, components with which heat exchange can be performed during a defrosting operation in order to cause evaporation of refrigerant compressed in an outdoor heat exchanger are limited to the indoor heat exchangers that account for less than half of the total and to refrigerant pipes in the bypasses circuits disposed in parallel with the hot-water supply heat exchangers. This prevents an evaporation capacity from being secured and results in a long-duration defrosting operation, thus causing a problem.

The present invention has been made to overcome such a problem as described above and aims to provide a combined air-conditioning and hot-water supply system that can reduce the duration of the defrosting operation.

Solution to Problem

A combined air-conditioning and hot-water supply system according to the present invention includes a refrigeration cycle, a hot-water supply load circuit, and a controller. In the refrigeration cycle, a compressor, an outdoor heat exchanger, air-conditioning expansion means, and an indoor heat exchanger are connected to one another in series by using pipes. The compressor, the outdoor heat exchanger, hot-water supply expansion means, and a refrigerant-side passage of a refrigerant-heat medium heat exchanger are connected to one another in series by using pipes. The refrigerant-side passage of the refrigerant-heat medium heat exchanger and the hot-water supply expansion means are connected in parallel with a bypass path by using pipes, the bypass path including a bypass solenoid valve and bypassing the refrigerant-heat medium heat exchanger. Refrigerant circulates in the refrigeration cycle. In the hot-water supply load circuit, a circulation pump, a heat medium passage of the refrigerant-heat medium heat exchanger, and a hot-water-storing tank are connected to one another in series by using pipes. A heat medium circulates in the hot-water supply load circuit. The refrigeration cycle and the hot-water supply load circuit are connected in cascade with each other to perform heat exchange between the refrigerant and the heat medium in the refrigerant-refrigerant heat exchanger. The controller controls the air-conditioning expansion means, the hot-water supply expansion means, and the bypass solenoid valve. The controller controls the bypass solenoid valve and the hot-water supply expansion means in a defrosting operation, based on a refrigerant temperature on a refrigerant inlet side of the refrigerant-heat medium heat exchanger and a heat medium temperature on a heat medium inlet side of the refrigerant-heat medium heat exchanger.

Advantageous Effects of Invention

With the combined air-conditioning and hot-water supply system according to the present invention, the bypass solenoid valve and the hot-water supply expansion means are controlled in the defrosting operation based on the refrigerant temperature on the refrigerant inlet side of the refrigerant-heat medium heat exchanger and the heat medium temperature on the heat medium inlet side of the refrigerant-heat medium heat exchanger, and thus the duration of the defrosting operation can be reduced.

DESCRIPTION OF EMBODIMENTS

Hereinafter, Embodiments of the present invention will be described based on the drawings.

Embodiment 1

Figure 1:
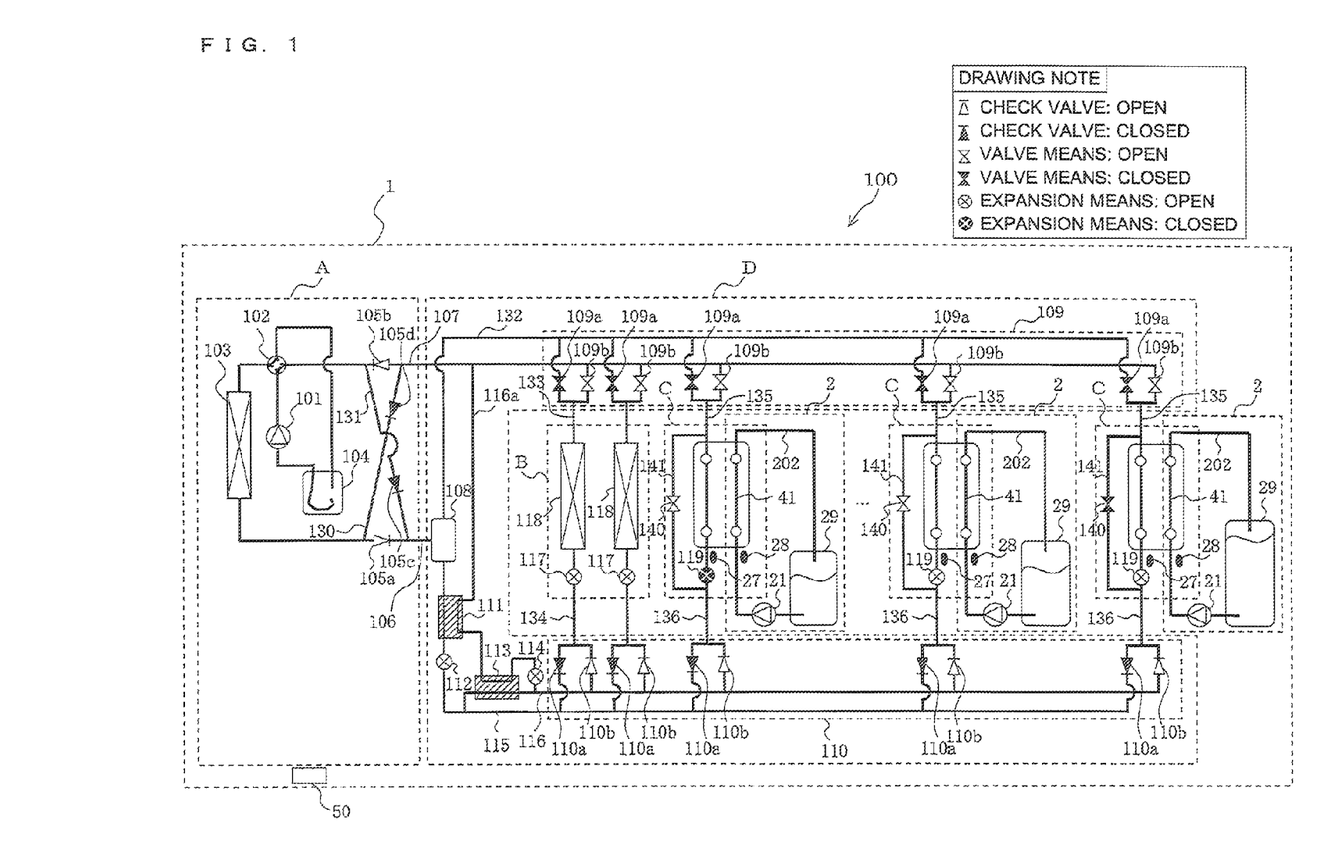
FIG. 1 is a circuit diagram schematically illustrating a refrigerant circuit configuration of a combined air-conditioning and hot-water supply system according to Embodiment 1 of the present invention.

FIG. 1 is a circuit diagram schematically illustrating a refrigerant circuit configuration of a combined air-conditioning and hot-water supply system according to Embodiment 1 of the present invention. A refrigerant circuit configuration and operation of a combined air-conditioning and hot-water supply system 100 will be described based on FIG. 1. Note that the size relationships between components in the following drawings including FIG. 1 might differ from actual relationships.

The combined air-conditioning and hot-water supply system 100 is installed in a building, an apartment, or the like and is capable of simultaneously supplying a cooling load, a heating load, and a hot-water supply load by utilizing a refrigeration cycle in which refrigerant is circulated. The combined air-conditioning and hot-water supply system 100 includes a refrigeration cycle 1 and hot-water load circuits 2. The refrigeration cycle 1 and each hot-water load circuit 2 are configured to be able to perform heat exchange by using a refrigerant-heat medium heat exchanger 41 without mixing of the refrigerant in the refrigeration cycle 1 and a heat medium (such as water or brine) in the hot-water load circuit 2.

Note that the heat medium is water in Embodiments 1 to 3.

The combined air-conditioning and hot-water supply system 100 is provided with a controller 50 that performs centralized control over the combined air-conditioning and hot-water supply system 100. The controller 50 controls the driving frequency of a compressor 101, the rotation speed of an unillustrated air-sending device, switching over in a four-way valve 102, the opening degree of various expansion means, the driving frequencies of circulation pumps 21, opening and closing of valve means 109a and valve means 109b, and the like. In other words, the controller 50 includes a microcomputer or the like and controls actuators (driving parts included in the combined air-conditioning and hot-water supply system 100) to execute operation of the combined air-conditioning and hot-water supply system 100, the control being performed in accordance with detection information from unillustrated various detection devices and an instruction from a remote controller.

An unillustrated storage device for storing various information pieces is also provided. The storage device includes a memory or the like, and a data table or the like is stored therein in advance, the data table including a preset water temperature (set heat-medium temperature), described later, information pieces regarding a first temperature a to a fifth temperature e, and a freezing temperature.

{Configuration of Refrigeration Cycle 1}

The refrigeration cycle 1 includes a heat source unit A, an indoor unit B (or a plurality of indoor units B), a plurality of hot-water supply units C, and a relay unit D. Among these, the indoor unit B and each hot-water supply unit C are connected in parallel to the heat source unit A. The relay unit D is disposed between: the heat source unit A; and the indoor unit B and the hot-water supply units C. The relay unit D changes a flow of the refrigerant to thereby cause the indoor unit B to function as an indoor heating unit or an indoor cooling unit.

[Heat Source Unit A]

The heat source unit A is equipped with the compressor 101, the four-way valve 102 that is a flow switching means, an outdoor heat exchanger 103, and an accumulator 104 that are connected to one another in series. The heat source unit A has a function of supplying the indoor unit B and the hot-water supply units C with a heat source (cooling or heating energy). Note that an air-sending device such as a fan for supplying the outdoor heat exchanger 103 with air may be disposed near the outdoor heat exchanger 103, but the air-sending device is not illustrated.

In addition, in the heat source unit A, a high-pressure-side connection pipe 106 disposed between the outdoor heat exchanger 103 and the relay unit D is provided with a check valve 105a allowing the refrigerant to flow only in a predetermined direction (direction from the heat source unit A to the relay unit D), and a low-pressure-side connection pipe 107 disposed between the four-way valve 102 and the relay unit D is provided with a check valve 105b allowing the refrigerant to flow only in a predetermined direction (from the relay unit D to the heat source unit A). The high-pressure-side connection pipe 106 and the low-pressure-side connection pipe 107 are connected to each other by using a first connection pipe 130 and a second connection pipe 131, the first connection pipe 130 connecting an upstream side of the check valve 105a and an upstream side of the check valve 105b, the second connection pipe 131 connecting a downstream side of the check valve 105a and a downstream side of the check valve 105b.

The first connection pipe 130 is provided with a check valve 105d allowing the refrigerant to flow only in a direction from the low-pressure-side connection pipe 107 to the high-pressure-side connection pipe 106. The second connection pipe 131 is also provided with a check valve 105c allowing the refrigerant to flow only in a direction from the low-pressure-side connection pipe 107 to the high-pressure-side connection pipe 106. Note that FIG. 1 illustrates a flow of the refrigerant during the defrosting operation, and thus illustrates a state where the refrigerant flows through the check valve 105a and the check valve 105b (illustrated in outlined symbols) but does not flow through the check valve 105b and the check valve 105c (illustrated in solid symbols).

The compressor 101 sucks the refrigerant and compresses the refrigerant into a high-temperature and high-pressure state. The four-way valve 102 changes the flow of the refrigerant. The outdoor heat exchanger 103 functions as an evaporator or a radiator (condenser) and performs heat exchange between air supplied from an unillustrated air-sending device and the refrigerant. The outdoor heat exchanger 103 evaporates and gasifies the refrigerant or condenses and liquefies the refrigerant. The accumulator 104 is disposed on the suction side of the compressor 101 and reserves excess refrigerant. Note that the accumulator 104 may be any container that can reserve the excess refrigerant.

[Indoor Unit B]

The indoor unit B is equipped with air-conditioning expansion means 117 and indoor heat exchangers 118. Each of the air-conditioning expansion means 117 is connected in series with a corresponding one of the indoor heat exchangers 118. The indoor unit B has functions of serving as the cooling load upon receiving the cooling energy supplied from the heat source unit A and serving as the heating load upon receiving the heating energy supplied from the heat source unit A. Note that an air-sending device such as a fan for supplying each indoor heat exchanger 118 with air may be disposed near the indoor heat exchanger 118. FIG. 1 illustrates as an example a case where each of the two air-conditioning expansion means 117 and a corresponding one of the two indoor heat exchangers 118 are installed in series. Further, for convenience, connection pipes connecting the relay unit D with the indoor heat exchangers 118 are referred to as connection pipes 133, and connection pipes connecting the relay unit D with the air-conditioning expansion means 117 are referred to as connection pipes 134.

Each air-conditioning expansion means 117 has functions of a pressure reducing valve and an expansion valve to depressurize and thus expand the refrigerant. The air-conditioning expansion means 117 may be formed by means with variably controllable opening degree, such as a precise flow-rate control means using an electronic expansion valve or an inexpensive refrigerant flow-rate adjustment means such as a capillary tube. Each indoor heat exchanger 118 functions as a radiator (condenser) and an evaporator and performs heat exchange between air supplied from the unillustrated air-sending device and the refrigerant. The indoor heat exchanger 118 evaporates and gasifies the refrigerant or condenses and liquefies the refrigerant.

[Hot-Water Supply Unit C]

Each hot-water supply unit C is equipped with the refrigerant-heat medium heat exchanger 41, hot-water supply expansion means 119 disposed on the refrigerant-passage side of the refrigerant-heat medium heat exchanger 41, and a bypass solenoid valve 140 disposed in a bypass path connected by using a pipe in parallel with the refrigerant-heat medium heat exchanger 41. The hot-water supply unit C includes part of the configuration of the refrigeration cycle 1 and part of a configuration of the hot-water load circuit 2, described later. The hot-water supply unit C has a function of supplying the hot-water load circuit 2 with the cooling energy from the heat source unit A or the heating energy via the refrigerant-heat medium heat exchanger 41. The refrigeration cycle 1 and the hot-water load circuit 2 are connected in cascade with the refrigerant-heat medium heat exchanger 41 placed in between. Note that the hot-water supply unit C also functions as a watercooler by utilizing the flow of the refrigerant. In addition, for convenience, a connection pipe connecting the relay unit D with the refrigerant-heat medium heat exchanger 41 is referred to as a connection pipe 135, and a connection pipe connecting the relay unit D with the hot-water supply expansion means 119 is referred to as a connection pipe 136. Moreover, a connection pipe that connects the connection pipe 135 and the connection pipe 136 with the bypass solenoid valve 140 placed in between and that forms a bypass path is referred to as a bypass pipe 141.

The hot-water supply expansion means 119, like the air-conditioning expansion means 117, functions as a pressure reducing valve and an expansion valve and depressurizes and thus expands the refrigerant. The hot-water supply expansion means 119 may be formed by means with variably controllable opening degree, such as a precise flow-rate control means using an electronic expansion valve or an inexpensive refrigerant flow-rate adjustment means such as a capillary tube. The refrigerant-heat medium heat exchanger 41 functions as a radiator (condenser) or an evaporator and is designed to perform heat exchange between the refrigerant circulating in refrigeration cycles of the refrigeration cycle 1 and the heat medium circulating in the hot-water load circuit 2.

Opening and closing the bypass solenoid valve 140 are switched while the combined air-conditioning and hot-water supply system 100 performs the defrosting operation, and thus whether to allow the refrigerant to flow into the bypass pipe 141 is controlled. In addition, opening and closing are switched together with the hot-water supply expansion means 119, and thereby a refrigerant passage is switched between a passage to the refrigerant-heat medium heat exchanger 41 and a passage to the bypass pipe 141. Further, the bypass solenoid valve 140 is also used to control an amount of the refrigerant flowing into the refrigerant-heat medium heat exchanger 41.

The hot-water supply unit C is provided with two temperature sensors. A first temperature sensor 27 is disposed on the refrigerant inlet side of the refrigerant-heat medium heat exchanger 41, that is, between the refrigerant-heat medium heat exchanger 41 and a second dividing portion 110 and mainly detects the temperature of the refrigerant flowing into the refrigerant-heat medium heat exchanger 41. A second temperature sensor 28 is disposed on the heat medium inlet side of the refrigerant-heat medium heat exchanger 41, that is, between the corresponding circulation pump 21, described later, and the refrigerant-heat medium heat exchanger 41 and detects the temperature of the heat medium flowing into the refrigerant-heat medium heat exchanger 41.

Information obtained by detection by these temperature sensors (temperature information) is transmitted to the controller 50 to be utilized for control of the actuators included in the combined air-conditioning and hot-water supply system 100, the controller 50 performing centralized control of operation of the combined air-conditioning and hot-water supply system 100.

[Relay Unit D]

The relay unit D has a function of connecting the indoor unit B and each hot-water supply unit C with the heat source unit A. In addition, one of the valve means 109a and the valve means 109b of a first dividing portion 109 is selectively opened or closed, and thereby the relay unit D determines that the indoor unit B is caused to function as the indoor heating unit or the indoor cooling unit and that the hot-water supply unit C is caused to function as the water-cooler or a hot-water supply device. The relay unit D is equipped with a gas-liquid separator 108, the first dividing portion 109, the second dividing portion 110, a first internal heat exchanger 111, a first relay expansion means 112, a second internal heat exchanger 113, and a second relay expansion means 114.

In the first dividing portion 109, the connection pipes 133 and the connection pipes 135 are each branched into two pipes. One of the two pipes is connected to the low-pressure-side connection pipe 107, and the other is connected to a connection pipe (referred to as a connection pipe 132) connected to the gas-liquid separator 108. In addition, the connection pipes 133 and the connection pipes 135 that are connected to the low-pressure-side connection pipe 107 are each provided with the valve means 109b that causes the refrigerant to or not to flow under the opening and closing control. The connection pipes 133 and the connection pipes 135 that are connected to the connection pipe 132 are also each provided with the valve means 109a that causes the refrigerant to or not to flow under the opening and closing control.

In the second dividing portion 110, the connection pipes 134 and the connection pipes 136 are also each branched into two pipes. One of the two pipes is connected to a first junction portion 115, and the other is connected to a second junction portion 116. In addition, the connection pipes 134 and the connection pipes 136 that are connected to the first junction portion 115 are each provided with a check valve 110a allowing the refrigerant to flow only in one direction. The connection pipes 134 and the connection pipes 136 that are connected to the second junction portion 116 are also each provided with a check valve 110b allowing the refrigerant to flow only in one direction. Note that instead of the check valve 110a and the check valve 110b, valve means such as a solenoid valve may be used to change the passage more reliably.

The first junction portion 115 connects the second dividing portion 110 to the gas-liquid separator 108 with the first relay expansion means 112 and the first internal heat exchanger 111 placed in between. The second junction portion 116 connects the second dividing portion 110 to the second junction portion 115 with the second internal heat exchanger 113 placed in between. In addition, the second junction portion 116 is branched between the second dividing portion 110 and the second internal heat exchanger 113 (hereinafter, one of the branching pipes is referred to as a branching pipe 116a). The branching pipe 116a is connected to the low-pressure-side connection pipe 107 with the second relay expansion means 114, the second internal heat exchanger 113, and the first internal heat exchanger 111 placed in between.

The gas-liquid separator 108 has a function of separating the refrigerant in the gas-liquid separator 108 into a gas refrigerant and a liquid refrigerant. The gas-liquid separator 108 is provided to the high-pressure-side connection pipe 106. One end of the gas-liquid separator 108 is connected to each valve means 109a of the first dividing portion 109, and the other end thereof is connected to the second dividing portion 110 with the first junction portion 115 placed in between. The first dividing portion 109 has a function of selectively opening or closing one of the valve means 109a and the valve means 109b in accordance with a required load of the indoor unit B and the hot-water supply unit C. The second dividing portion 110 has a function of allowing the refrigerant to flow only in one of directions by using the check valve 110a and the check valve 110b.

The first internal heat exchanger 111 performs heat exchange between the refrigerant flowing through the first junction portion 115 and the refrigerant flowing through the branching pipe 116a, the first junction portion 115 being located between the gas-liquid separator 108 and the first relay expansion means 112, the branching pipe 116a being located on the downstream side of the second internal heat exchanger 113. The first relay expansion means 112 is disposed in the first junction portion 115 between the first internal heat exchanger 111 and the second dividing portion 110 and depressurizes and expands the refrigerant. The first relay expansion means 112 may be formed by means with variable opening degree, such as a precise flow-rate control means using an electronic expansion valve or an inexpensive refrigerant flow-rate adjustment means such as a capillary tube.

The second internal heat exchanger 113 performs heat exchange between the refrigerant flowing through the second junction portion 116 and the refrigerant flowing through the branching pipe 116a located on the downstream side of the second relay expansion means 114. The second relay expansion means 114 is disposed in the second junction portion 116 located between the second internal heat exchanger 113 and the second dividing portion 110. The second relay expansion means 114 functions as a pressure reducing valve and an expansion valve to depressurize and thus expand the refrigerant. The second relay expansion means 114, like the first relay expansion means 112, may be formed by means with variably controllable opening degree, such as a precise flow-rate control means using an electronic expansion valve or an inexpensive refrigerant flow-rate adjustment means such as a capillary tube.

As described above, in the refrigeration cycle 1, the compressor 101, the four-way valve 102, the indoor heat exchanger 118, the air-conditioning expansion means 117, and the outdoor heat exchanger 103 are connected to one another in series, and the compressor 101, the four-way valve 102, the refrigerant-heat medium heat exchanger 41, the hot-water supply expansion means 119, and the outdoor heat exchanger 103 are connected to one another in series. The refrigeration cycle 1 is configured such that the indoor heat exchangers 118 and the refrigerant-heat medium heat exchangers 41 are connected in parallel with the relay unit D.

Note that the compressor 101 may be any compressor that can compress the sucked refrigerant into a high-pressure state, and the type of the compressor is not particularly limited. For example, the compressor 101 may be formed by using any of various types of compressors such as a reciprocating compressor, a rotary compressor, a scroll compressor, and a screw compressor. The compressor 101 may be formed as a type of compressor capable of variably controlling the rotation speed using an inverter, or another type of compressor the rotation speed of which is fixed. The type of the refrigerant circulating in the refrigeration cycle 1 is not particularly limited. For example, any of the following may be used: a natural refrigerant such as carbon dioxide ($CO_2$), carbon hydride, or helium; a substitute refrigerant not containing chloride such as HFC410A, HFC407C, or HFC404A; and a fluorocarbon refrigerant used for existing products such as R22 or R134a.

In addition, a case where the excess refrigerant is stored in a liquid receiver (the accumulator 104) in the refrigeration cycle 1 has been described, but the liquid receiver is not limited thereto. If the excess refrigerant is stored in a heat exchanger serving as a radiator in the refrigeration cycle, the accumulator 104 may be removed. Further, although FIG. 1 illustrates the case where the four or more indoor units B are connected, the number of connected indoor units B is not particularly limited. The capacity of each indoor unit B included in the refrigeration cycle 1 may be the same or may be different from one another from the highest to the lowest capacity.

{Operation of Refrigeration Cycle 1}

In a case where a decrease in the outside air temperature leads to the temperature of the outdoor heat exchanger 103 being 0 degrees C. or lower at the time of a heating operation, the outdoor heat exchanger 103 will have frost adhering thereto. Adhesion of large amounts of frost decreases the heating capacity, thus requiring a defrosting operation to melt the frost.

Hence, operation of the refrigeration cycle 1 performed when a defrosting operation is performed will be described, the defrosting operation being performed in accordance with the same circuit operation as a cooling operation.

The refrigerant flowing into the indoor unit B is depressurized by the air-conditioning expansion means 117 to be in a low-pressure gas state in which the temperature and the pressure are reduced. The refrigerant stores heat in the indoor heat exchanger 118, flows through the corresponding connection pipe 133 and then through the corresponding valve means 109b of the first dividing portion 109, and merges with the refrigerant in other flows in the low-pressure-side connection pipe 107.

In addition, the refrigerant flowing into each hot-water supply unit C is depressurized by the corresponding hot-water supply expansion means 119, is made to have a low temperature and a low pressure, stores heat in the refrigerant-heat medium heat exchanger 41 (that is, deprives the hot-water load circuit 2 of heat), and merges with the refrigerant flowing out of the indoor unit B in the low-pressure-side connection pipe 107.

After the merging, the refrigerant flows to the compressor 101 through the check valve 105b, the four-way valve 102, and the accumulator 104. The refrigerant in a high-pressure gas state that is made to have a high temperature and a high pressure in the compressor 101 is guided to the outdoor heat exchanger 103 and radiates heat to melt the frost adhering to the outdoor heat exchanger 103. Thereafter, the refrigerant flows through the check valve 105a, is guided to the high-pressure-side connection pipe 106, and flows into the gas-liquid separator 108 of the relay unit D.

The refrigerant flowing into the gas-liquid separator 108 flows through the first junction portion 115, exchanges heat, in the first internal heat exchanger 111, with the refrigerant expanded to have a low temperature and a low pressure by the second relay expansion means 114, and thereby obtains the degree of subcooling. The refrigerant passes through the first relay expansion means 112, converges, in the first junction portion 115, with the refrigerants flowing out of the indoor unit B and the hot-water supply units C, and flows into the second internal heat exchanger 113. The refrigerant flowing into the second internal heat exchanger 113 exchanges heat, in the second internal heat exchanger 113, with the refrigerant expanded to have a low temperature and a low pressure by the second relay expansion means 114, and thereby obtains the degree of subcooling. The refrigerant flows toward the second relay expansion means 114. The refrigerant is divided to also flow toward the second dividing portion 110 and return to the indoor unit B.

The refrigerant flowing through the second relay expansion means 114 passes through the branching pipe 116a, exchanges heat in the second internal heat exchanger 113 and the first internal heat exchanger 111, and evaporates. Thereafter, the refrigerant is guided to the low-pressure-side connection pipe 107, passes through the check valve 105b, the four-way valve 102, and the accumulator 104, and flows toward the compressor 101.

{Configuration of Hot-Water Load Circuit 2}

Each hot-water load circuit 2 is configured such that the circulation pump 21, the heat medium passage side of the refrigerant-heat medium heat exchanger 41, and a hot-water-storing tank 29 are connected by using a heat medium pipe 202. In other words, the hot-water load circuit 2 is configured such that the circulation pump 21, the heat medium passage side of the refrigerant-heat medium heat exchanger 41, and the hot-water-storing tank 29 are connected to one another in series by using the heat medium pipe 202 to form a heat medium circuit.

The type of the heat medium circulating through the heat medium pipe 202 is not particularly limited. For example, a refrigerant (a refrigerant of the same type of the refrigerant circulating in the refrigeration cycle 1 or a refrigerant of one of various types), brine (an antifreeze solution), water, a mixture of brine and water, a mixture of water and highly anticorrosive additive, or the like may be used. In addition, the heat medium pipe 202 may be formed by, for example, a copper pipe, a stainless pipe, a steel pipe, a vinyl chloride pipe, or the like.

The circulation pump 21 sucks the heat medium stored in the hot-water-storing tank 29, pressurizes the heat medium, and circulates the heat medium through the heat medium pipe 202. The circulation pump 21 may be formed as a type of compressor with variably controllable rotation speed using an inverter, or another type of compressor the rotation speed of which is fixed. The circulation pump 21 may be any pump that feeds a heat medium, and the type of the circulation pump 21 is not particularly limited.

The refrigerant-heat medium heat exchanger 41 is used for heat exchange between the heat medium circulating through the hot-water load circuit 2 and the refrigerant circulating in the refrigeration cycle 1, as described above.

The hot-water-storing tank 29 stores therein the heat medium heated by the refrigerant-heat-medium heat exchanger 41.

{Operation of Hot-Water Load Circuit 2}

The relatively low-temperature heat medium stored in the hot-water-storing tank 29 is first drawn out from the bottom of the hot-water-storing tank 29 and pressurized by the circulation pump 21. The heat medium pressurized by the circulation pump 21 flows into the refrigerant-heat medium heat exchanger 41 on the heat medium passage side. In the refrigerant-heat medium heat exchanger 41, the refrigerant circulating in the refrigeration cycle 1 heats the heat medium circulating through the hot-water load circuit 2. The heated heat medium returns to a relatively high-temperature upper portion of the hot-water-storing tank 29 to be stored in the hot-water-storing tank 29.

For example, in a case where hot water supply is needed during an air-conditioning cooling operation in summer, a boiler or the like is conventionally required to supply hot water. However, as described above, the combined air-conditioning and hot-water supply system 100 collects and reuses heating energy that is conventionally discharged to the atmosphere, thus supplying hot water. Accordingly, the system COP is considerably increased, and energy is saved.

Figure 2:
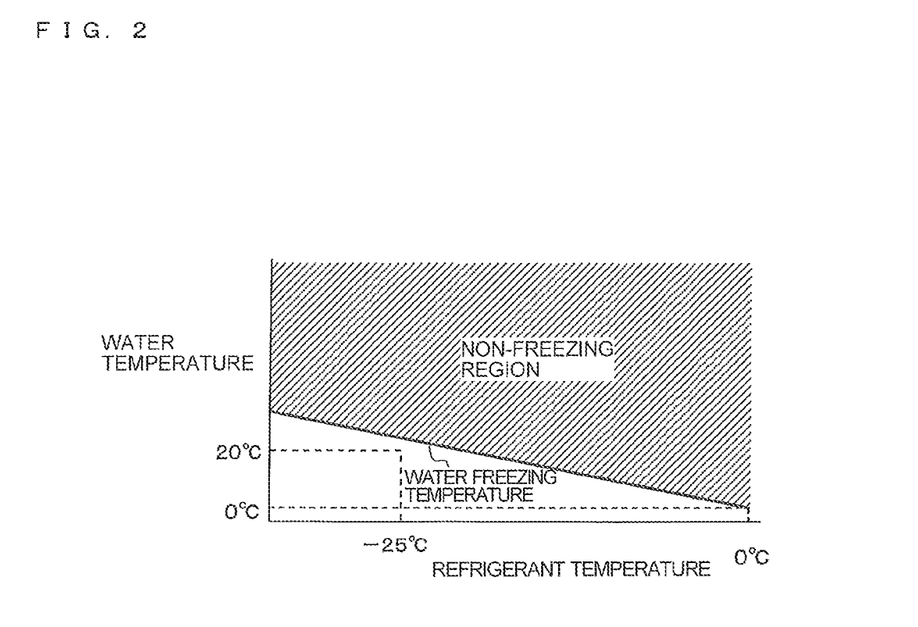
FIG. 2 is a graph illustrating a water freezing relationship between a refrigerant temperature and a water temperature in the combined air-conditioning and hot-water supply system according to Embodiment 1 of the present invention.

FIG. 2 is a graph illustrating a water freezing relationship between a refrigerant temperature and a water temperature in the combined air-conditioning and hot-water supply system according to Embodiment 1 of the present invention.

As illustrated in FIG. 2, freezing of water that is the heat medium depends on not only the water temperature but also the temperature of the refrigerant flowing into the refrigerant-heat medium heat exchanger 41. For example, in a case where the water temperature is 20 degrees C. but where the temperature of the refrigerant to be subjected to heat exchange is −25 degrees C., water might freeze.

Accordingly, to prevent the water from freezing during the defrosting operation performed by the combined air-conditioning and hot-water supply system 100, the water temperature needs to be maintained higher than the water freezing temperature illustrated in FIG. 2.

Figure 3:
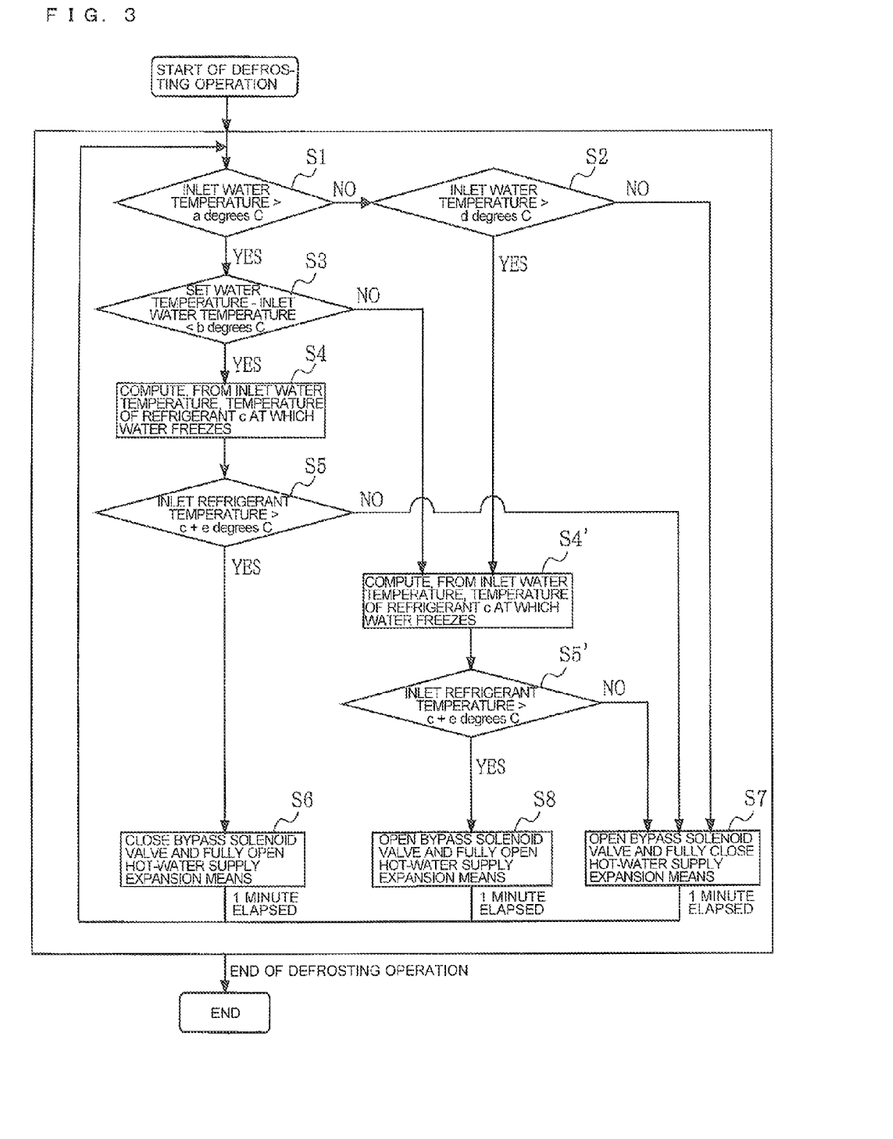
FIG. 3 is a flowchart illustrating control of hot-water supply expansion means and a bypass solenoid valve during a defrosting operation in the combined air-conditioning and hot-water supply system according to Embodiment 1 of the present invention.
Figure 4:
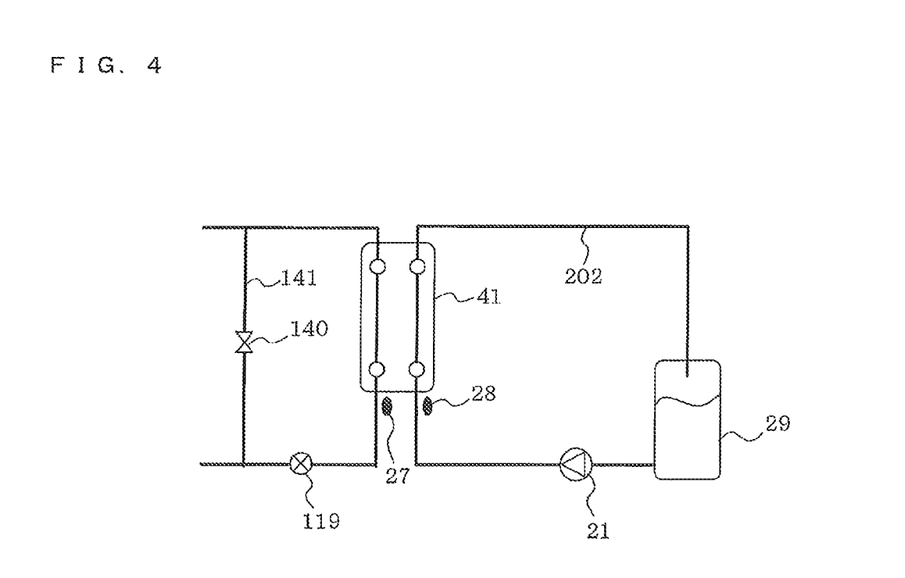
FIG. 4 is an enlarged diagram of a hot-water load circuit 2 and a hot-water supply unit C in the refrigerant circuit configuration of the combined air-conditioning and hot-water supply system according to Embodiment 1 of the present invention.

FIG. 3 is a flowchart illustrating control of hot-water supply expansion means and a bypass solenoid valve during the defrosting operation in the combined air-conditioning and hot-water supply system according to Embodiment 1 of the present invention. FIG. 4 is an enlarged diagram of the hot-water load circuit 2 and the hot-water supply unit C in the refrigerant circuit configuration of the combined air-conditioning and hot-water supply system according to Embodiment 1 of the present invention.

Hereinafter, control of the hot-water supply expansion means and the bypass solenoid valve during the defrosting operation in the combined air-conditioning and hot-water supply system 100 according to Embodiment 1 will be described with reference to FIG. 3.

First, upon starting the defrosting operation in the combined air-conditioning and hot-water supply system 100, the controller 50 determines whether a water temperature detected by the second temperature sensor 28 (hereinafter, referred to as an inlet water temperature) is higher than a first temperature a (inlet water temperature>a degrees C.) (S1). At this time, a is a temperature serving as a reference for obtaining heat from water.

If (S1) is satisfied, the controller 50 determines whether a value obtained by subtracting the inlet water temperature from a preset water temperature is lower than a second temperature b (preset water temperature−inlet water temperature<b degrees C.) (S3). At this time, b is the likelihood of the preset water temperature and may be set at, for example, 5 degrees C. The determination is made to prevent an excessive decrease in water temperature caused by obtaining heat from the water during the defrosting operation.

If (S3) is satisfied, the controller 50 calculates from the inlet water temperature a third temperature c that is a temperature of the refrigerant at which water freezes (S4). At this time, to calculate c, a data table providing a water freezing relationship, as in FIG. 2, between a refrigerant temperature and a water temperature may be referred to, the data table being stored in advance in the storage device. Alternatively, c may be calculated by using a heat balance calculation.

Upon completing the calculation of c, the controller 50 determines whether a refrigerant temperature detected by the first temperature sensor 27 (hereinafter, referred to as an inlet refrigerant temperature) is higher than a temperature obtained by adding c to the fifth temperature e (inlet refrigerant temperature>c+e degrees C.) (S5). At this time, e is a water freezing margin and may be set at, for example, 3 degrees C.

If (S5) is satisfied, the controller 50 closes the bypass solenoid valve 140 and fully opens the hot-water supply expansion means 119. This is performed to obtain heat from the water by taking a route of the refrigerant passage to the refrigerant-heat medium heat exchanger 41 and thus causing the refrigerant to flow into the refrigerant-heat medium heat exchanger 41 (S6). The defrosting capacity can thereby be enhanced.

On the other hand, if (S1) is not satisfied, the controller 50 determines whether the inlet water temperature is higher than a fourth temperature d (inlet water temperature>d degrees C.) (S2). At this time, d may be set, for example, at the lowest water temperature allowing an operation.

If (S2) is satisfied, or if (S3) is not satisfied, the controller 50 calculates from the inlet water temperature a temperature of the refrigerant c at which water freezes, as in (S4) (S4').

Upon completing the calculation of c, the controller 50 determines whether the refrigerant temperature detected by the first temperature sensor 27 (hereinafter, the inlet refrigerant temperature) is higher than a temperature obtained by adding c to e (inlet refrigerant temperature>c+e degrees C.), as in (S5) (S5').

If (S5') is satisfied, the bypass solenoid valve 140 is opened, and the hot-water supply expansion means 119 is fully opened (S8). This is performed to restrict an amount of the refrigerant flowing into the refrigerant-heat medium heat exchanger 41 and thus to restrict the obtaining of heat from the water, by flowing the refrigerant into not only the refrigerant-heat medium heat exchanger 41 but also into the bypass pipe 141. This enhances the defrosting capacity by obtaining heat from the water and also protects the refrigerant-heat medium heat exchanger 41 by preventing freezing of the water deprived of heat by the refrigerant.

On the other hand, if (S2) is not satisfied, if (S5) is not satisfied, or if (S5') is not satisfied, the controller 50 opens the bypass solenoid valve 140 and fully closes the hot-water supply expansion means 119, because water freezing is concerned (S7). This is performed to stop obtaining heat from the water by taking a route of the refrigerant passage to the bypass pipe 141 and thus by preventing the refrigerant from flowing into the refrigerant-heat medium heat exchanger 41. The water deprived of heat by the refrigerant is thereby prevented from freezing, and thus the refrigerant-heat medium heat exchanger 41 is protected.

The series of determinations and operations is repeated, for example, every one minute. After the defrosting operation is terminated, the control is terminated and transition to a general control operation is made.

As described above, during the defrosting operation in the combined air-conditioning and hot-water supply system 100, control of the opening and closing of the bypass solenoid valves 140 and the hot-water supply expansion means 119 is preformed based on the refrigerant temperature and the water temperature. The temperature of the water that is the heat medium is thereby kept higher than the water freezing temperature to protect the refrigerant-heat medium heat exchanger 41 from being damaged due to water freezing. In addition, the defrosting capacity can be enhanced by obtaining heat from the water. As a result, the duration of the defrosting operation can be reduced.

Embodiment 2

Figure 5:
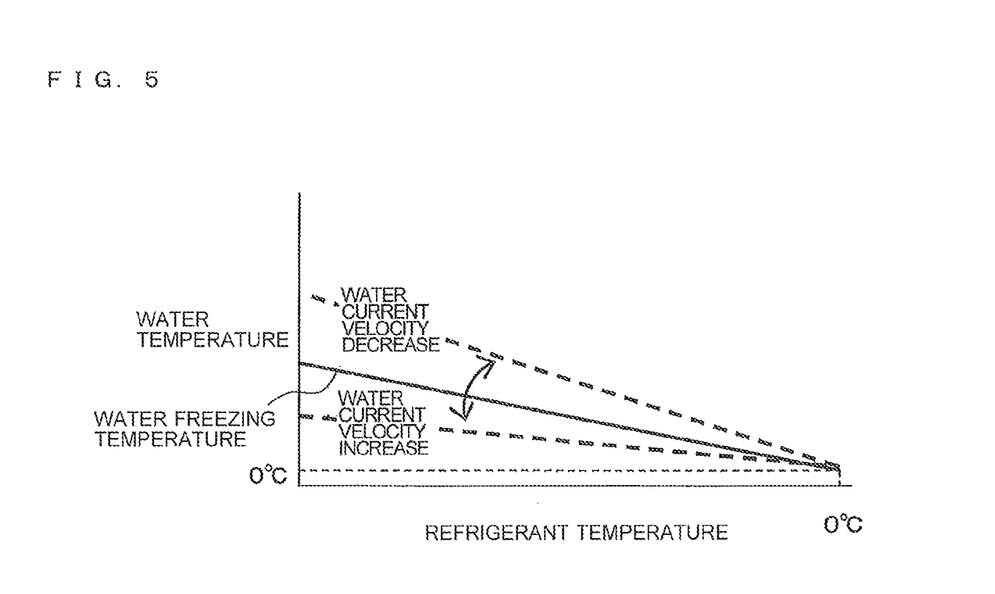
FIG. 5 is a graph illustrating a relationship between a water freezing temperature and a water flow rate in a combined air-conditioning and hot-water supply system according to Embodiment 2 of the present invention.
Figure 6:
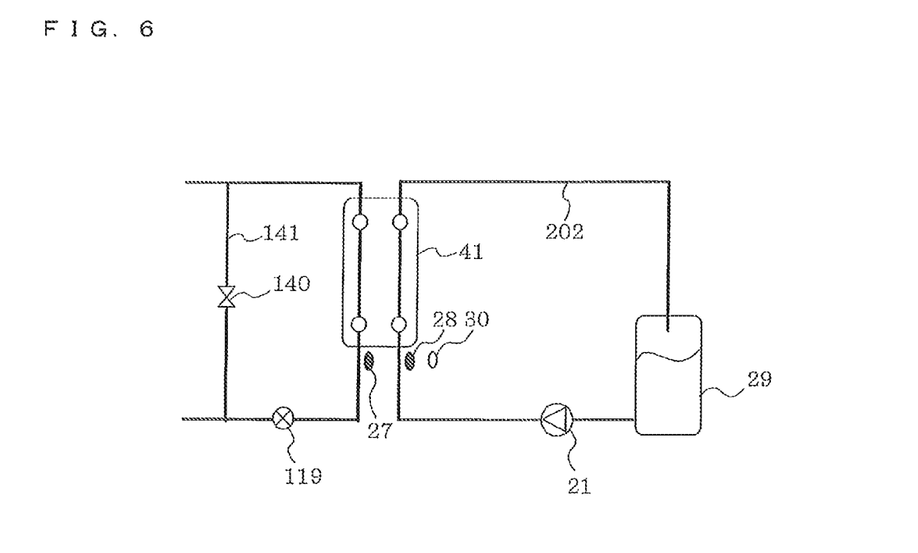
FIG. 6 is an enlarged diagram of the hot-water load circuit 2 and a hot-water supply unit C in a refrigerant circuit configuration of the combined air-conditioning and hot-water supply system according to Embodiment 2 of the present invention.

FIG. 5 is a graph illustrating a relationship between a water freezing temperature and a water flow rate in a combined air-conditioning and hot-water supply system according to Embodiment 2 of the present invention. FIG. 6 is an enlarged diagram of the hot-water load circuit 2 and a hot-water supply unit C in a refrigerant circuit configuration of the combined air-conditioning and hot-water supply system according to Embodiment 2 of the present invention.

Note that components other than the hot-water load circuit 2 and the hot-water supply unit C in the combined air-conditioning and hot-water supply system according to Embodiment 2 are the same as those of the combined air-conditioning and hot-water supply system 100 according to Embodiment 1. Hence, Embodiment 2 mainly describes a difference from Embodiment 1. The same components as in Embodiment 1 are denoted by the same reference numerals, and a description thereof is omitted.

As illustrated in FIG. 5, freezing of the water that is the heat medium depends not only on the water temperature and the refrigerant temperature but also on the velocity of the water circulating through the heat medium pipe 202 (hereinafter, referred to as a water flow rate). It is understood from FIG. 5 that a decreased water flow rate causes the water to freeze more easily, and an increased water flow rate causes the water to freeze less easily.

Hence, as illustrated in FIG. 6, a current-velocity detection sensor 30 is installed between the refrigerant-heat medium heat exchanger 41 and the circulation pump 21, that is, on the heat medium inlet side of the refrigerant-heat medium heat exchanger 41. The current-velocity detection sensor 30 detects the velocity of the water flowing into the refrigerant-heat medium heat exchanger 41.

Hereinafter, control of the hot-water supply expansion means and the bypass solenoid valve performed during the defrosting operation in a combined air-conditioning and hot-water supply system 100 according to Embodiment 2 will be described with reference to FIG. 3.

In (S4) and (S4'), the controller 50 calculates the temperature of the refrigerant c at which water freezes from the inlet water temperature and the water flow rate. At this time, to calculate c, a data table describing a water freezing relationship as in FIG. 5 among a refrigerant temperature, a water temperature, and a water flow rate may be referred to, the data table being stored in advance in the storage device. The other steps are the same as those in Embodiment 1, and thus a description thereof is omitted.

As described above, not only the water temperature but also the water flow rate are used when the temperature of the refrigerant c at which water freezes is calculated, and thus a more accurate temperature of the refrigerant c at which water freezes can be calculated than in Embodiment 1.

Thus, the defrosting operation can be performed more efficiently in the combined air-conditioning and hot-water supply system 100.

Embodiment 3

Figure 7:
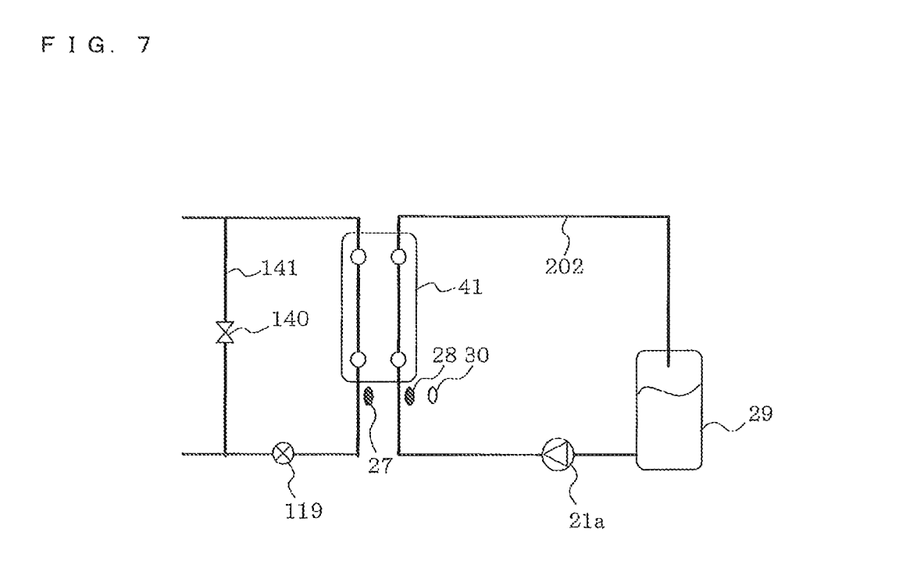
FIG. 7 is an enlarged diagram of a hot-water load circuit 2 and the hot-water supply unit C in a refrigerant circuit configuration of a combined air-conditioning and hot-water supply system according to Embodiment 3 of the present invention.

FIG. 7 is an enlarged diagram of a hot-water load circuit 2 and the hot-water supply unit C in a refrigerant circuit configuration of a combined air-conditioning and hot-water supply system according to Embodiment 2 of the present invention.

Note that components other than the hot-water load circuit 2 and the hot-water supply unit C in the combined air-conditioning and hot-water supply system according to Embodiment 3 are the same as those of the combined air-conditioning and hot-water supply system 100 according to Embodiments 1 and 2. Hence, Embodiment 3 mainly describes a difference from Embodiments 1 and 2. The same components as in Embodiments 1 and 2 are denoted by the same reference numerals, and a description thereof is omitted.

A circulation pump 21a is formed as a type of compressor with variably controllable rotation speed using an inverter. In other words, the circulation pump 21 according to Embodiment 3 can change the velocity of the water circulating through the heat medium pipe 202 by changing output therefrom.

Accordingly, the circulation pump 21a increases the water flow rate during the defrosting operation in a combined air-conditioning and hot-water supply system 100, and thereby a duration allowing heat to be obtained from the water can be increased.

Thus, the defrosting operation in the combined air-conditioning and hot-water supply system 100 can be performed more efficiently.

REFERENCE SIGNS LIST 1 refrigeration cycle 2 hot-water load circuit 21 circulation pump 21a circulation pump 27 first temperature sensor 28 second temperature sensor 29 hot-water-storing tank 30 current-velocity detection sensor 41 refrigerant-heat medium heat exchanger 50 controller 100 combined air-conditioning and hot-water supply system 101 compressor 102 four-way valve 103 outdoor heat exchanger 104 accumulator 105a check valve 105b check valve 105c check valve 105d check valve 106 high-pressure-side connection pipe 107 low-pressure-side connection pipe 108 gas-liquid separator 109 first dividing portion 109a valve means 109b valve means 110 second dividing portion 110a check valve 110b check valve 111 first internal heat exchanger 112 first relay expansion means 113 second internal heat exchanger 114 second relay expansion means 115 first junction portion 116 second junction portion 116a branching pipe 117 air-conditioning expansion means 118 indoor heat exchanger 119 hot-water supply expansion means 130 first connection pipe 131 second connection pipe 132 connection pipe 133 connection pipe 134 connection pipe 135 connection pipe 136 connection pipe 140 bypass solenoid valve 141 bypass pipe 202 heat medium pipe A heat source unit B indoor unit C hot-water supply unit D relay unit.

The invention claimed is:

1. A combined air-conditioning and hot-water supply system comprising:
   a refrigeration cycle in which a compressor, an outdoor heat exchanger, an air-conditioning expansion unit, and an indoor heat exchanger are connected to one another in series by using pipes, in which the compressor, the outdoor heat exchanger, a hot-water supply expansion unit, and a refrigerant-side passage of a refrigerant-heat medium heat exchanger are connected to one another in series by using pipes, in which the refrigerant-side passage of the refrigerant-heat medium heat exchanger and the hot-water supply expansion unit are connected in parallel with a bypass path by using pipes, the bypass path including a bypass solenoid valve and bypassing the refrigerant-heat medium heat exchanger, and in which refrigerant circulates;
   a hot-water supply load circuit in which a circulation pump, a heat medium passage of the refrigerant-heat medium heat exchanger, and a hot-water-storing tank are connected to one another in series by using pipes, and in which a heat medium circulates,
   the refrigeration cycle and the hot-water supply load circuit being connected in cascade with each other to perform heat exchange between the refrigerant and the heat medium in the refrigerant-heat medium heat exchanger; and a controller that controls the air-conditioning expansion unit, the hot-water supply expansion unit, and the bypass solenoid valve, the controller controlling the bypass solenoid valve and the hot-water supply expansion unit in a defrosting operation, based on a refrigerant temperature on a refrigerant inlet side of the refrigerant-heat medium heat exchanger and a heat medium temperature on a heat medium inlet side of the refrigerant-heat medium heat exchanger, wherein the controller calculates a third temperature that is a temperature of the refrigerant at which the heat medium freezes when the heat medium temperature is higher than a first temperature and where a value obtained by subtracting the heat medium temperature from a preset heat medium temperature is lower than a second temperature, and the controller closes the bypass solenoid valve and opens the hot-water supply expansion unit if the refrigerant temperature is higher than a value obtained by adding a water freezing margin to the third temperature.

2. The combined air-conditioning and hot-water supply system of claim 1, wherein in a case where the heat medium temperature is lower than the first temperature and higher than a fourth temperature, the controller calculates the third temperature, and in a case where the refrigerant temperature is higher than a value obtained by adding a water freezing margin to the third temperature, the controller opens the bypass solenoid valve and also opens the hot-water supply expansion unit.

3. The combined air-conditioning and hot-water supply system of claim 1, wherein in a case where the heat medium temperature is higher than the first temperature and where a value obtained by subtracting the heat medium temperature from the preset heat medium temperature is higher than the second temperature, the controller calculates the third temperature, and in a case where the refrigerant temperature is higher than a value obtained by adding a water freezing margin to the third temperature, the controller opens the bypass solenoid valve and also opens the hot-water supply expansion unit.

4. The combined air-conditioning and hot-water supply system of claim 1, wherein in a case where the heat medium temperature is lower than the first temperature and is also lower than a fourth temperature, the controller opens the bypass solenoid valve and closes the hot-water supply expansion unit.

5. The combined air-conditioning and hot-water supply system of claim 1, wherein in a case where the heat medium temperature is lower than the first temperature and is higher than a fourth temperature, the controller calculates the third temperature, and in a case where the refrigerant temperature is lower than a value obtained by adding a water freezing margin to the third temperature, the controller opens the bypass solenoid valve and closes the hot-water supply expansion unit.

6. The combined air-conditioning and hot-water supply system of claim 1, wherein in a case where the heat medium temperature is higher than the first temperature and where a value obtained by subtracting the heat medium temperature from a preset heat medium temperature is higher than the second temperature, the controller calculates the third temperature, and in a case where the refrigerant temperature is lower than a value obtained by adding a water freezing margin to the third temperature, the controller opens the bypass solenoid valve and closes the hot-water supply expansion unit.

7. The combined air-conditioning and hot-water supply system of claim 1, wherein in a case where the heat medium temperature is higher than the first temperature and where a value obtained by subtracting the heat medium temperature from the preset heat medium temperature is lower than the second temperature, the controller calculates the third temperature, and in a case where the refrigerant temperature is lower than a value obtained by adding a water freezing margin to the temperature, the controller opens the bypass solenoid valve and closes the hot-water supply expansion unit.

8. The combined air-conditioning and hot-water supply system of claim 1, wherein the controller repeatedly controls the bypass solenoid valve and the hot-water supply expansion unit at regular intervals, in the defrosting operation.

9. The combined air-conditioning and hot-water supply system of claim 1, wherein a first temperature sensor that detects the refrigerant temperature is disposed on the refrigerant inlet side of the refrigerant-heat medium heat exchanger, and a second temperature sensor that detects the heat medium temperature is disposed on the heat medium inlet side of the refrigerant-heat medium heat exchanger.

10. The combined air-conditioning and hot-water supply system of claim 1, further comprising:

a flow rate detection sensor that detects a flow rate of the heat medium and that is provided to the hot-water supply load circuit, wherein the controller controls the bypass solenoid valve and the hot-water supply expansion unit in the defrosting operation, based on the refrigerant temperature, the heat medium temperature, and the flow rate of the heat medium detected by the flow rate detection sensor.

11. The combined air-conditioning and hot-water supply system of claim 10, wherein the flow rate detection sensor is disposed on the heat medium inlet side of the refrigerant-heat medium heat exchanger.

12. The combined air-conditioning and hot-water supply system of claim 10, wherein the circulation pump changes the flow rate of the heat medium circulating in the hot-water supply load circuit.

* * * * *

UNITED STATES PATENT AND TRADEMARK OFFICE
CERTIFICATE OF CORRECTION

PATENT NO.       : 9,631,826 B2  
APPLICATION NO.  : 14/647510  
DATED            : April 25, 2017  
INVENTOR(S)      : Takanao Kimura et al.

Page 1 of 1

It is certified that error appears in the above-identified patent and that said Letters Patent is hereby corrected as shown below:

On the Title Page

Correct assignee in item (73) to read as follows:  
Mitsubishi Electric Corporation Signed and Sealed this  
Fourth Day of July, 2017

Joseph Matal  
*Performing the Functions and Duties of the*  
*Under Secretary of Commerce for Intellectual Property and*  
*Director of the United States Patent and Trademark Office*